(12) United States Patent
Okada et al.

(10) Patent No.: US 7,537,371 B2
(45) Date of Patent: May 26, 2009

(54) BACKLIGHT DEVICE AND LIQUID CRYSTAL DISPLAY DEVICE

(75) Inventors: Naotada Okada, Yokohama (JP); Toshitake Kitagawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/966,340

(22) Filed: Dec. 28, 2007

(65) Prior Publication Data
US 2008/0165551 A1 Jul. 10, 2008

(30) Foreign Application Priority Data
Jan. 4, 2007 (JP) ............... 2007-000199
Dec. 19, 2007 (JP) ............... 2007-327655

(51) Int. Cl.
*F21V 7/04* (2006.01)
(52) U.S. Cl. .................. 362/613; 362/612; 349/65; 349/68; 385/901
(58) Field of Classification Search ......... 362/611–614; 349/65, 68; 385/901
See application file for complete search history.

(56) References Cited
U.S. PATENT DOCUMENTS
2007/0064444 A1* 3/2007 Kim et al. .................. 362/612
2008/0106912 A1* 5/2008 Yeom ......................... 362/613

FOREIGN PATENT DOCUMENTS
JP       10-40872      2/1998

* cited by examiner

*Primary Examiner*—Stephen F Husar
(74) *Attorney, Agent, or Firm*—Oblon, Spivak, McClelland, Maier & Neustadt, P.C.

(57) ABSTRACT

The backlight device includes a plurality of packages, and a light guide plate. The package includes a housing for package, and a plurality of light sources. The housing for package includes a tubular part having a wall surrounding the circumference, a bottom wall provided at one end of the tubular part, and a passing part provided at the other end of the tubular part for passing the light from inside to outside of the tubular part. The plurality of light sources are contained in the housing for package and disposed in the bottom wall, and emit light. The plurality of packages are arrayed in one direction. At least part of the layout of light sources relative to the incident plane is different from mutually adjacent packages.

8 Claims, 11 Drawing Sheets

BACKLIGHT DEVICE AND LIQUID CRYSTAL DISPLAY DEVICE

CROSS-REFERENCE TO RELATED APPLICATIONS

This application is based upon and claims the benefit of priority from prior Japanese Patent Applications No. 2007-000199, filed Jan. 4, 2007; and No. 2007-327655, filed Dec. 19, 2007, the entire contents of both of which are incorporated herein by reference.

BACKGROUND OF THE INVENTION

1. Field of the Invention

The present invention relates to a sidelight type backlight device used in, for example, a liquid crystal display or other liquid crystal display devices. The invention also relates to a liquid crystal display device provided with a backlight device.

2. Description of the Related Art

Conventionally, in a display for electronic appliances such as a portable computer, for example, a liquid crystal display is used in consideration of portable use. The liquid crystal display is composed of a liquid crystal panel, which is a non-luminous display device. Accordingly, the liquid crystal display device has a backlight device for illuminating the liquid crystal panel.

A portable electronic appliance is reduced in thickness. Hence, a sidelight type is used as the backlight device.

The sidelight type backlight device is generally provided with a light source and a light guide plate for guiding the light emitted from the light source to an entire liquid crystal panel region. An incident plane which receives the light emitted from the light source is formed at a side face of the light guide plate. An exit plane which emits the incident light from the incident plane is formed at an upper part of the light guide plate. The light source is, for example, a fluorescent lamp. The light source is disposed near the incident plane. This kind of backlight device is disclosed in, for example, Jpn. Pat. Appln. KOKAI Publication No. 10-40872.

Other backlight device uses a light-emitting diode (LED) as the light source. In this kind of backlight device, a red, blue, and green LED are contained in one housing to serve as an LED package, and a plurality of LED packages may be used.

When the red, blue and green LEDs are housed in one package, red, blue, and green are mixed. As a result, the light emitted from the LED package is white.

In a specific structure of the LED package thus configured, the LED package includes the housing, red, blue, and green LEDs.

The housing is made of a resin having enough reflectivity for mixing the colors of the light components emitted from the LEDs efficiently, and is formed in a so-called bathtub structure having a vertical wall surrounding the circumference. The LEDs are contained in the housing, and are disposed in a substantially triangular shape linking the LEDs so that the colors of the light components emitted from the LEDs may be mixed efficiently. The inside of the housing is sealed with a permeable resin so that the light components emitted from the LEDs may escape outside.

The LED packages are arranged in a row so that the positions sealed with the permeable resin (the inside openings surrounded by the vertical wall) may be directed to the incident plane of the light guide plate within the housing.

However, in the backlight device formed of plural LED packages having such configuration and arranged in one row, color fluctuation is likely to occur on the light guide plate. This point will be more specifically explained below.

As mentioned above, the housing of the LED package is a bathtub structure. Each LED is disposed to form a substantially triangular shape linking these LEDs. Accordingly, each LED is disposed at a position slightly shifted to either vertical wall in the housing.

As a result, in a plan view of LEDs (when the backlight device is seen from above), any of the LEDs is shifted to one side of the LED package array direction. For example, when the red LED is shifted to one side of the LED package array direction, the shape of the illumination range when the illumination range of red light emitted from the LED package is seen in a plan view is defined by a line linking the red LED in the LED package array direction in the vertical wall of the housing and the red LED close to it, and a line linking the red LED in the LED package array direction in the vertical wall and the red LED remote from it. The shape of the thus defined illumination range is a shape biased to the other side of the LED array direction.

To the contrary, in a plan view of the LED package, the shape of the illumination range of the LED, for example, a blue LED arranged at the opposite side of the red LED in the LED package array direction is biased to one side.

Hence, at one side of the LED package array direction, the red light hardly reaches the vicinity of the LED package, and at the other side, the blue right hardly reaches the vicinity of the LED package.

As a result, in the light guide plate, at one side of the LED array direction, the rate of blue light is higher, thus making color mixing difficult, and uneven color is likely to occur. Similarly, in the light guide plate, at the other side of the LED array direction, the rate of red light is higher, thus making color mixing difficult, and uneven color is likely to occur.

In the above explanation, the red and blue LEDs are spaced from each other in the LED array direction, but this is not a limited example. Uneven color is likely to occur if any one of the plural LEDs contained in the housing is biased to any position of the vertical wall.

BRIEF SUMMARY OF THE INVENTION

It is hence an object of the invention to provide a backlight device capable of suppressing uneven color on the light guide plate. It is another object of the invention to provide a liquid crystal display device provided with a backlight device capable of suppressing uneven color on the light guide plate.

The backlight device of the invention comprises a plurality of packages and a light guide plate. The light guide plate includes an incident plane which receives the light emitted from the package, and an exit plane which emits the incident light from the incident plane to outside. Said plurality of packages are arrayed in one direction. The package includes a housing for package, and a plurality of light sources. The housing for package includes a tubular part having a wall surrounding the circumference, a bottom wall provided at one end of the tubular part, and a passing part provided at the other end of the tubular part for allowing the light to be transmitted from the inside of the tubular part to outside. Said plurality of light sources are contained in the housing for package and disposed in the bottom wall, and are designed to emit light. At least a part of the arrangement of the light sources with respect to the incident plane is different from the adjacent packages.

The liquid crystal display device of the invention comprises a housing for liquid crystal display device, a liquid crystal panel, and a backlight device. The liquid crystal panel is contained in the housing for liquid crystal display device. The backlight device is contained in the housing for liquid crystal display device. The backlight device has a plurality of packages and a light guide plate. The light guide plate has an incident plane which receives the light emitted from the package, and an exit plane which emits the incident light from the incident plane to outside. Said plurality of packages are arrayed in one direction. The package includes a housing for package, and a plurality of light sources. The housing for package includes a tubular part having a wall surrounding the circumference, a bottom wall provided at one end of the tubular part, and a passing part provided at the other end of the tubular part for allowing the light to be transmitted from the inside of the tubular part to outside. Said plurality of light sources are contained in the housing for package, and disposed in the bottom wall and are designed to emit light. At least part of the arrangement of the light sources with respect to the incident plane is different from the adjacent packages.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
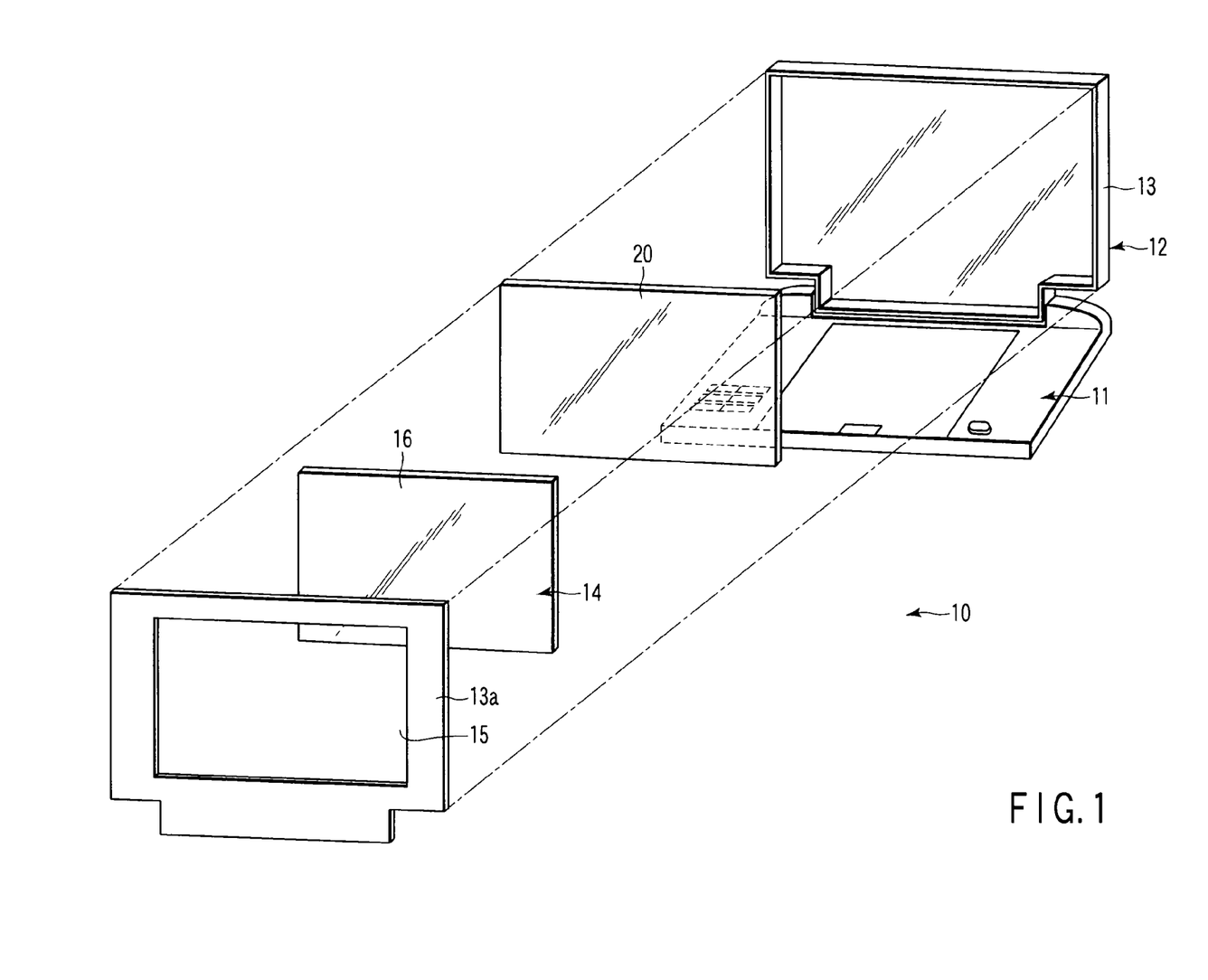
FIG. 1 is a partially exploded perspective view of a portable DVD player provided with a backlight device according to a first embodiment of the invention.

A backlight device according to a first embodiment of the invention is described while referring to FIGS. 1 to 10. FIG. 1 is a partially exploded perspective view of a portable Digital Versatile Disc (DVD) player 10 provided with a backlight device 20 of the embodiment. The portable DVD player 10 is an example of an electronic appliance provided with the backlight device 20. The backlight device 20 may be also used in other electronic appliances such as portable telephone.

As shown in FIG. 1, the portable DVD player 10 includes a main body 11, and a liquid crystal display device 12. The main body 11 accommodates a disc not shown. The liquid crystal display device 12 is attached to the main body 11, and is designed to display images.

FIG. 1 shows a disassembled state of the liquid crystal display device 12. The liquid crystal display device 12 includes a first housing 13, a liquid crystal panel 14, and the backlight device 20. The liquid crystal panel 14 and the backlight device 20 are contained in the first housing 13. The first housing 13 is an example of the housing for liquid crystal display device of the invention.

While the liquid crystal display device 12 is standing upright to the main body 11, a opening 15 is formed in a front wall 13a of the first housing 13 directed forward. The first housing 13 is rotatably coupled to the main body 11 between the exposed position of the opening 15 and the closed position of the opening 15. The liquid crystal panel 14 has a screen 16. The screen 16 is exposed outside of the first housing 13 by way of the opening 15. In FIG. 1, the first housing 13 is separated from the front wall 13a, but this is not a limited example. Anyway, the first housing 13 may be designed to incorporate therein the liquid crystal panel 14 and the backlight device 20.

Figure 2:
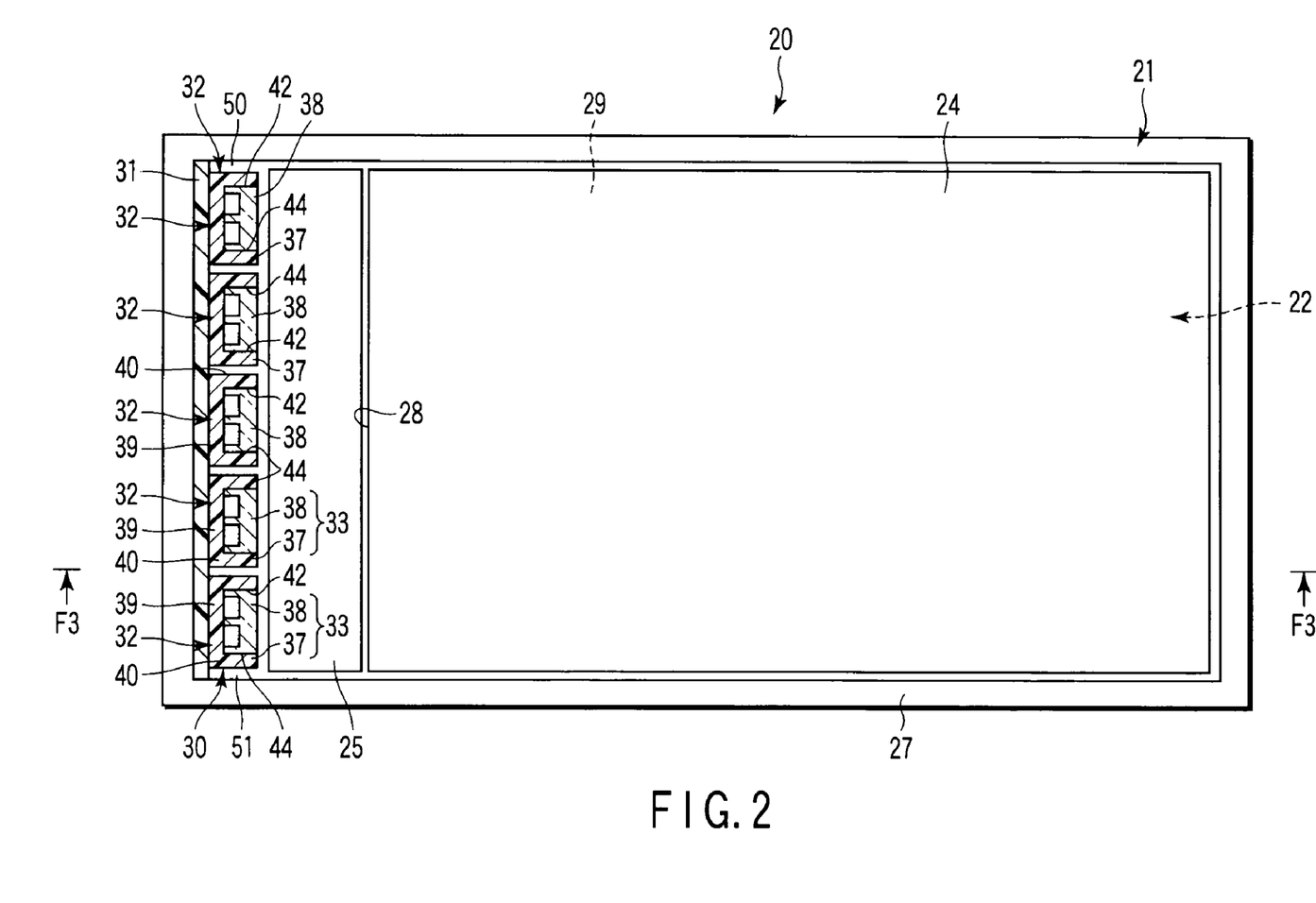
FIG. 2 is a plan view of the backlight device shown in FIG. 1.
Figure 3:
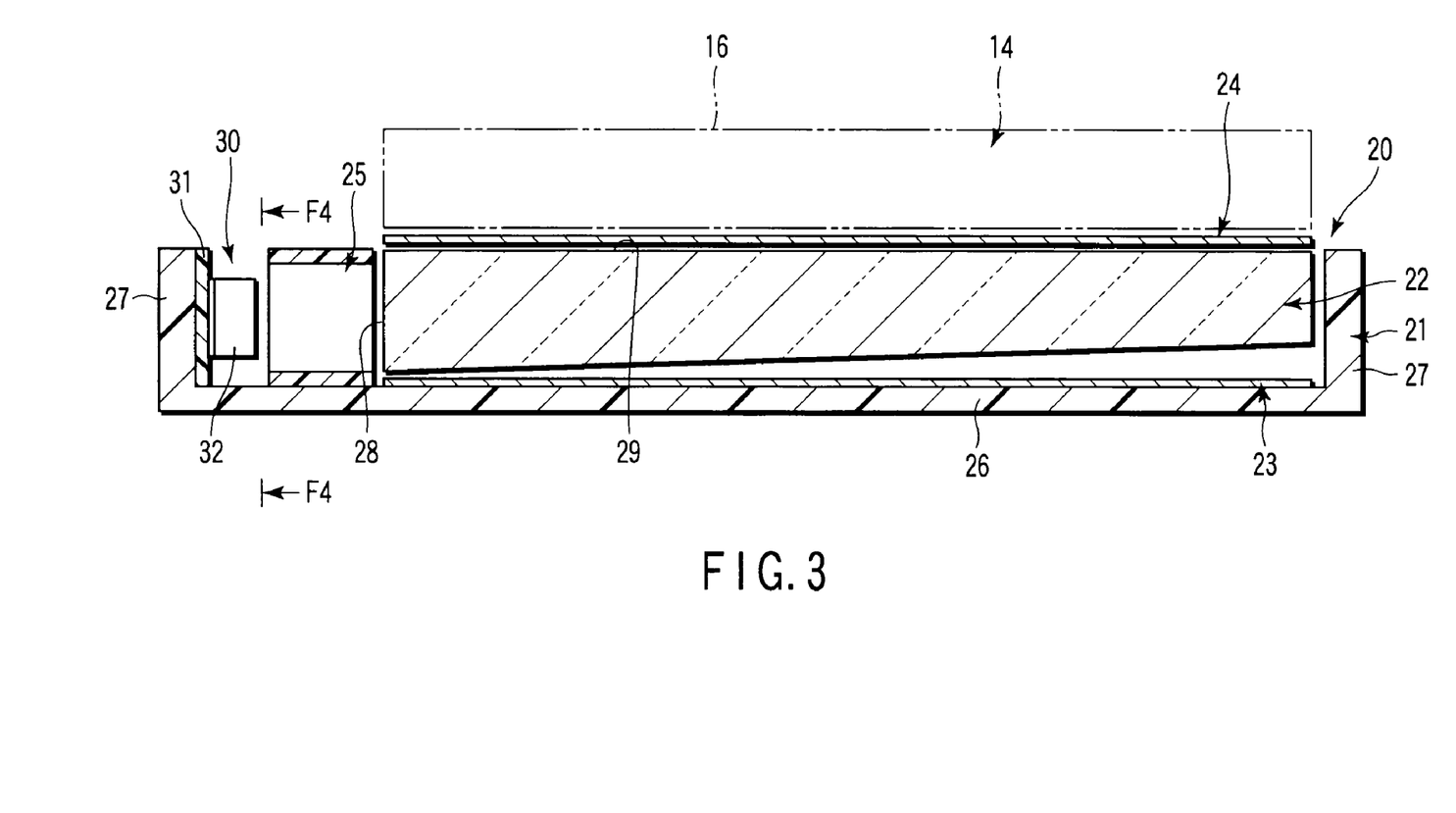
FIG. 3 is a sectional view of the backlight device shown along line F3-F3 in FIG. 2.

The backlight device 20 is disposed at the opposite side of the opening 15 across the liquid crystal panel 14, and confronts the liquid crystal panel 14. The backlight device 20 illuminates the liquid crystal panel 14. FIG. 2 is a plan view of the backlight device 20 seen from above. FIG. 3 is a sectional view of the backlight device 20 shown along line F3-F3 in FIG. 2. In FIG. 3, the liquid crystal panel 14 is indicated by twin-dot chain line. A relative positional relation between the liquid crystal panel 14 and the backlight device 20 in FIG. 3 is similar to a relative positional relation between the liquid crystal panel 14 and the backlight device 20 in the first housing 13.

As shown in FIGS. 2 and 3, the backlight device 20 includes a second housing 21, a light guide plate 22, a reflection sheet 23, a diffusion sheet 24, a light guide 25, and a light source unit 30.

As shown in FIG. 3, the second housing 21 is a box opened at the liquid crystal panel 14 side and closed at the bottom. The second housing 21 has a bottom wall 26 and a vertical wall 27. The bottom wall 27 has a substantially rectangular plane shape. The vertical wall 27 is erected upright from the entire region of the peripheral edge of the bottom wall 26. Hence, the plane shape of the inside space defined by the vertical wall 27 and the bottom wall 27 is substantially rectangular.

The light guide plate 22 is contained in the second housing 21. As shown in FIG. 3, the light guide plate 22 guides the light emitted from the light source unit 30 described below into the liquid crystal panel 14. The light guide plate 22 has an incident plane 28 and an exit plane 29. The incident plane 28 is formed at the side face of the light guide plate 22, and confronts the inside of the second housing 21. The incident plane 28 receives the light emitted from the light source unit 30. The exit plane 29 is formed at a position opposite to the liquid crystal panel 14 in the light guide plate 22. The exit plane 29 emits the incident light from the incident plane 29 toward the liquid crystal panel 14.

The reflection sheet 23 is provided at the inside of the bottom wall 26, and confronts the light guide plate 22. The diffusion sheet 24 is disposed between the light guide plate 22 and the liquid crystal panel 14. The light guide 25 is disposed between the incident plane 28 of the light guide plate 22 and the light source unit 30.

Figure 4:
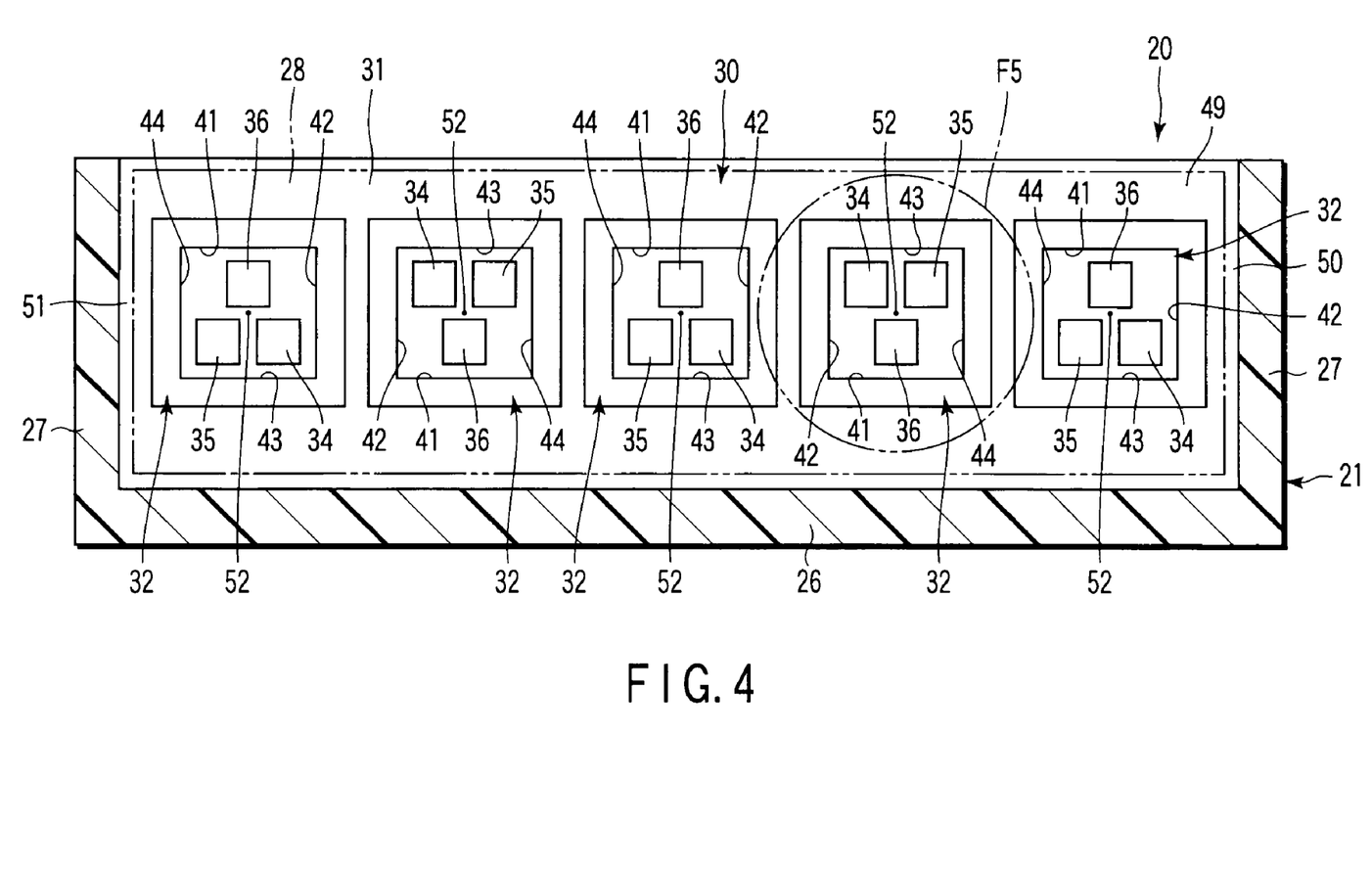
FIG. 4 is a sectional view of the backlight device shown along line F4-F4 in FIG. 3.

FIG. 4 is a sectional view of the backlight device 20 shown along line F4-F4 in FIG. 3. FIG. 4 shows a front view of the light source unit 30. As shown in FIGS. 2, 3 and 4, the light source unit 30 is disposed at a position confronting the incident plane 28 of the light guide plate 22 at the inside of the second housing 21, and is designed to emit light to the incident plane 28. In FIG. 4, the incident plane 28 is indicated by twin-dot chain line. The light source unit 30 includes a substrate 31 and a plurality of LED packages 32.

As shown in FIGS. 2 and 3, the substrate 31 is fixed at a position confronting the incident plane 28 of the light guide plate at the inside of the second housing 21. As shown in FIG. 4, the LED packages 32 are arranged in a row on the substrate 31. A specific configuration of the LED packages 32 on the substrate 31 will be described in detail below.

Figure 5:
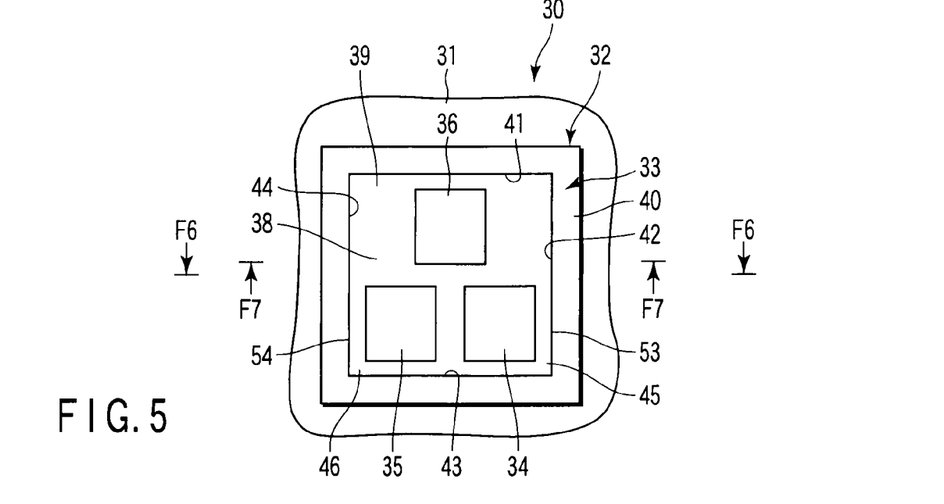
FIG. 5 is a magnified front view of the range of F5 shown in FIG. 4.

FIG. 5 is a magnified front view of the range of F5 shown in FIG. 4. FIG. 5 is a front view of one LED package 32. As shown in FIG. 5, the LED package 32 includes a third housing 33, a red LED 34, a blue LED 35, and a green LED 36. The LED packages 32 are identical in structure, and one LED package is shown as a structural example.

Figure 6:
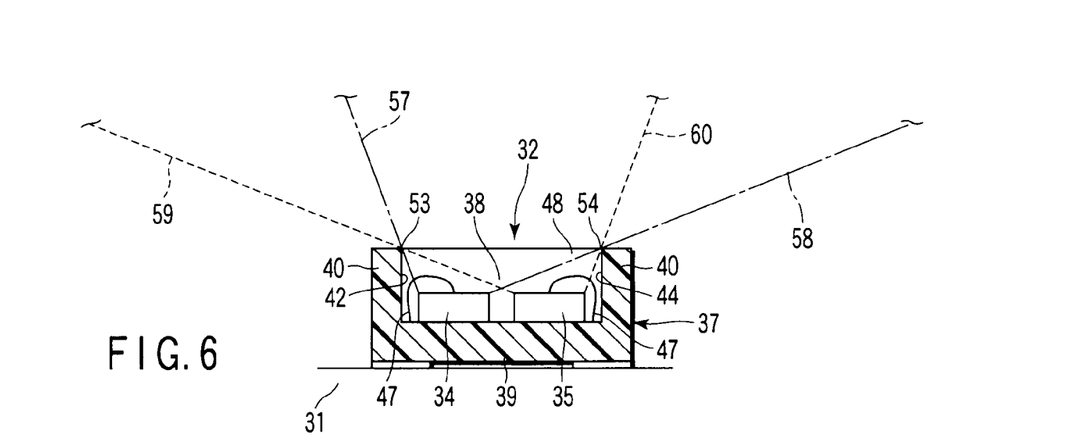
FIG. 6 is a sectional view of an LED package shown along line F6-F6 in FIG. 5.

FIG. 6 is a sectional view of the LED package 32 shown along line F6-F6 in FIG. 5. As shown in FIG. 6, the third housing 33 includes a housing main body 37 of box type opened at one end, and a sealing part 38. The third housing 33 is an example of the housing for package of the invention.

The housing main body 37 has a bottom wall 39 and a vertical wall 40. As shown in FIG. 5, the bottom wall 39 has a substantially rectangular plane shape. The vertical wall 40 is erected upright from the entire region of the peripheral edge of the bottom wall 39. Hence, the vertical wall 40 is tubular, and the plane shape of the inside space of the housing main body 37 defined by the vertical wall 40 is substantially rectangular. The vertical wall 40 is an example of the tubular part of the invention. The housing main body 37 is formed of an impermeable resin and does not pass light from inside to outside.

The red LED 34 emits a red light. The blue LED 35 emits a blue light. The green LED 36 emits a green light. The red LED 34, blue LED 35, and green LED 36 are contained inside the housing main body 37. The plane shape of the red LED 34, blue LED 35, and green LED 36 is, for example, rectangular. The LEDs 34, 35, 36 are disposed to form a substantially triangular shape mutually, and are fixed to the bottom wall 39.

The layout of the LEDs 34, 35, 36 will be more specifically described. The vertical wall 40 has a first inner face 41, a second inner face 42, a third inner face 43, and a fourth inner face 44. The first inner face 41 is positioned at an upper side in FIG. 5. The second inner face 42 is positioned at a right side in the drawing. The third inner face 43 is positioned at a lower side in FIG. 5. The fourth inner face 44 is positioned at a left side in FIG. 5.

The red LED 34 is disposed near an angle 45 defined by the second inner face 42 and the third inner face 43. The blue LED 35 is disposed near an angle 46 defined by the third inner face 43 and the fourth inner face 44. The red LED 34 and the blue LED 35 are placed side by side along the third inner face 43. The green LED 36 is placed between the first inner face 41 and the red LED 34 and blue LED 35, and is disposed at a position confronting the center of the first inner face 41.

In other words, the inner face positioned near the green LED 36 is the first inner face 41, the inner faces positioned near the red LED 34 are the second and third inner faces 42, 43, and the inner faces positioned near the blue LED 35 are the third and fourth inner faces 43, 44. Thus, in each LED package 32, the LEDs 34, 35, 36 have an identical layout pattern.

Figure 7:
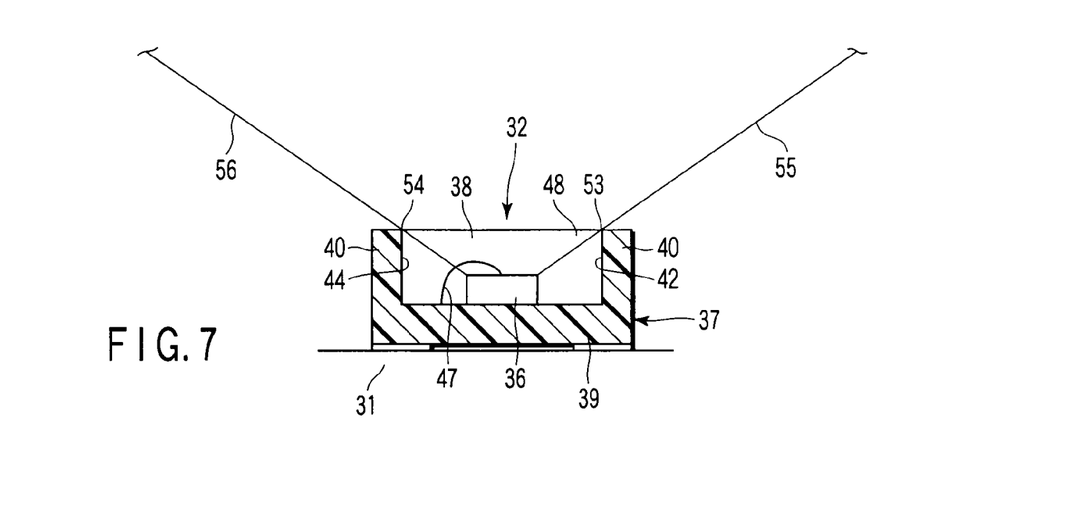
FIG. 7 is a sectional view of an LED package shown along line F7-F7 in FIG. 5.

FIG. 6 is a sectional view of the red LED 34 and the blue LED 35 as seen from the first inner face 41. FIG. 7 is a sectional view of the LED package 32 shown along line F7-F7 in FIG. 5. FIG. 7 is a sectional view of the LED package 32 of the green LED 36 as seen from the third inner face 43.

As shown in FIGS. 6 and 7, the green LED 36, the red LED 34, and the blue LED 35 are electrically connected to the substrate 31 by way of a wiring 47.

As shown in FIG. 6, the sealing part 38 seals the inside of the housing main body 37. The sealing part 38 is permeable, and the exit light components from the LEDs 34, 35, 36 are not prevented from escaping to outside from the opening 48 of the housing main body 37. The sealing part 38 is formed of transparent or diffusible epoxy or silicone resin, and functions as the passing part of the invention. In FIGS. 6 and 7, the sealing part 38 is not indicated with hatchings.

The layout and position of the LED packages 32 on the substrate 31 will be explained. In the embodiment, as shown in FIGS. 2 and 4, for example, five LED packages 32 are used. In FIG. 2, the LED package 32 and the substrate 31 are shown in partially cut-off state. In each LED package 32, the sealing part 38 is fixed on the substrate 31 so as to confront the incident plane 28 of the light guide plate 22, and the LED packages 32 are arranged in a row along the incident plane 28.

As shown in FIG. 4, configurations of the mutually adjacent LED packages 32 on the substrate 31 are different. Specifically speaking, the LED package 32 disposed at one end 50 in the drawing (one end of array direction of LED packages 32) is disposed so that, for example, the green LED 36 may be directed to the opening 49 side of the second housing 21.

The positions of the other LED packages 32 rotate 180 degrees about an axial center line 52 of the housing main body 37 along with shift to the side of the other end 51 (other end of array direction of LED packages 32). The axial center line 52 is indicated by a dot in the drawing. That is, the mutually adjacent LED packages 32 in the array direction of the LED packages 32 are disposed at positions rotating 180 degrees relatively about the axial center line 52 of the third housing 33. Hence, in the light source unit 30, the LED packages 32 are arranged so that the first inner face 41 and the third inner face 43 may be arranged alternately at the side of the opening 49 of the second housing 21.

As a result, the layout of the LEDs 34, 35, 36 in each LED package 32 with respect to the incident plane 28 is designed to be different mutually between the adjacent LED packages 32.

The light components emitted from the LED packages 32 in such configuration (the light components passing through outside from the sealing part 38 out of the light components emitted from the green LED 36, red LED 34, and blue LED 35) are emitted to the incident plane 28 of the light guide plate 22.

The next explanation is about the shape of the illumination range of the light components of the LEDs 34, 35, 36 emitted outside through the sealing part 38 as seen from the side of the opening 49 of the second housing 21. As stated above, in each LED package 32, any one of the first inner face 41 and the third inner face 43 is positioned at the side of the opening 49.

Accordingly, the shape of the illumination range of the light components emitted from each LED package 32 as seen from the side of the opening 49 is the same as the shape of the light emitted from each LED package 32 seen from the first inner face 41. The first inner face 41 and the third inner face 43 are opposite to each other. Therefore, the shape of the illumination range of the light components emitted from the LED packages 32 as seen from the side of the third inner face 43 is same as the shape as seen from the side of the first inner face 41.

FIG. 7 shows the shape of the illumination range of the green LED 36 as seen from the side of the third inner face 43. The shape of the illumination range of the green LED 36 emitted from the LED package as seen from the side of the third inner face 43 is defined by first and second lines 55, 56 linking the green LED 36 and edges 53, 54 of the second and fourth inner faces 42, 44. The illumination range is the area enclosed by the first and second lines 55, 56.

As shown in FIG. 7, the green LED 36 is disposed at a position confronting nearly the center of the first and third inner faces 41, 43 as mentioned above. Hence, the first line 55 linking the green LED 36 and the edge 53 of the second inner face 42, and the second line 56 linking the green LED 36 and the edge 54 of the fourth inner face 44 are mutually symmetrical across the green LED 36.

As a result, the shape of the illumination range of the green LED 36 emitted from the LED package 32 as seen from the side of the third inner face 43 is a shape spreading outside similarly at both sides of the second and fourth inner faces 42, 44. Herein, "outside" means the direction toward the second and fourth inner faces 42, 44 from the green LED 36.

FIG. 6 shows the shape of the illumination range of the red LED 34 and the blue LED 35 as seen from the side of the first inner face 41. The shape of the illumination range of the red LED 34 as seen from the side of the first inner side 41 is defined by third and fourth lines 57, 58 linking the red LED 34 and the edges 53, 54 of the second and fourth inner faces 42, 44. The illumination range is the area enclosed by the third and fourth lines 57, 58. The third and fourth lines 57, 58 are indicated by single-dot chain line.

As shown in FIG. 6, the red LED 34 is disposed at a position close to the second inner face 42 as mentioned above. Hence, as compared with the third line 57 linking the red LED 34 and the edge 53 of the second inner face 42, the fourth line 58 linking the red LED 34 and the edge 54 of the fourth inner face 44 is largely inclined. As a result, the shape of the illumination range of the red LED 34 as seen from the side of the first inner face 41 is a shape biased to the side of the fourth inner face 44.

The shape of the illumination range of the blue LED 35 as seen from the side of the first inner face 41 is defined by fifth and sixth lines 59, 60 linking the blue LED 35 and the edges 53, 54 of the second and fourth inner faces 42, 44. The illumination range is an area enclosed by the fifth and sixth lines 59, 60. The fifth and sixth lines 59, 60 are indicated by dotted line.

As shown in FIG. 6, the blue LED 35 is disposed at a position close to the fourth inner face 44 as mentioned above. Hence, as compared with the sixth line 60 linking the blue LED 35 and the edge 54 of the fourth inner face 44, the fifth line 59 linking the blue LED 35 and the edge 53 of the second inner face 42 is largely inclined. As a result, the shape of the illumination range of the blue LED 35 as seen from the side of the first inner face 41 is a shape biased to the side of the second inner face 42.

Among the light components of the LEDs 34, 35, 36 emitted from the LED packages 32, distribution of the light components entering the light guide 25 and the light guide plate 22 will be explained.

Figure 8:
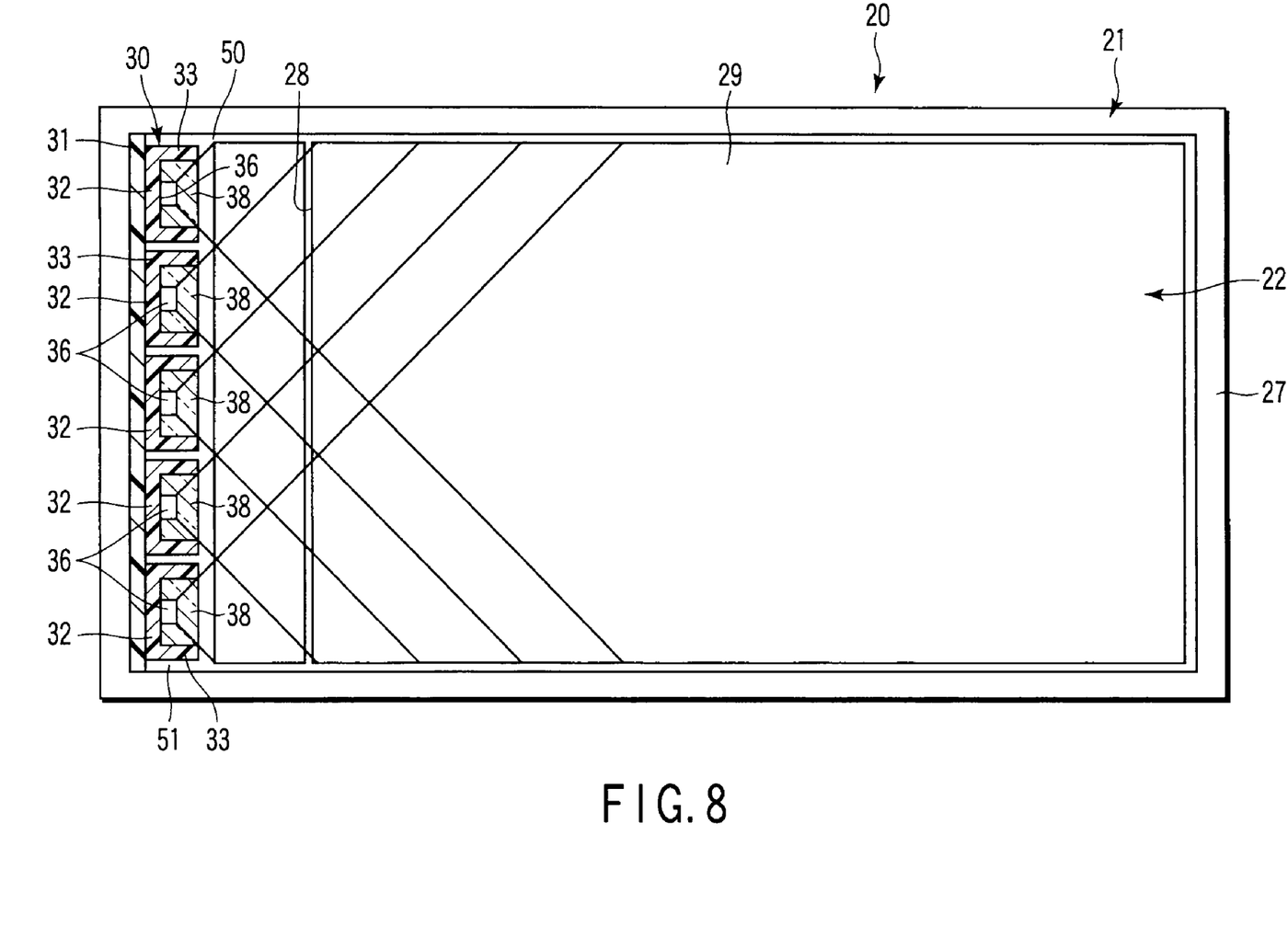
FIG. 8 is a plan view of an example of distribution of green light emitted from each LED package shown in FIG. 2 in a light guide and a light guide plate.

FIG. 8 shows an example of distribution of green light emitted from each LED package 32 in the light guide 25 and the light guide plate 22. In FIG. 8, light components reflected by the light guide 25 and the light guide plate 22 are not shown. In FIG. 8, for the ease of understanding the position of the green LED 36 in relation to the LED package 32 and the substrate 31, a partially cut-off state is shown. As shown in FIG. 8, the green LED 36 is disposed at a position confronting nearly the center of the first and third inner faces 41, 43, and the guide light 25 and the light guide plate 22 are illuminated almost uniformly.

The green light emitted from each LED package 32 is considered to reach the end of the light source unit 30 side at the one end 50 and the other end 51 of the light guide plate 22. Specifically, the relative shape and relative position of the third housing 33 and the green LED 36 are taken into consideration. For example, the position of the edges 53, 54 of the vertical wall 40 of the third housing 33 relative to the position of the green LED 36 is taken into consideration.

Figure 9:
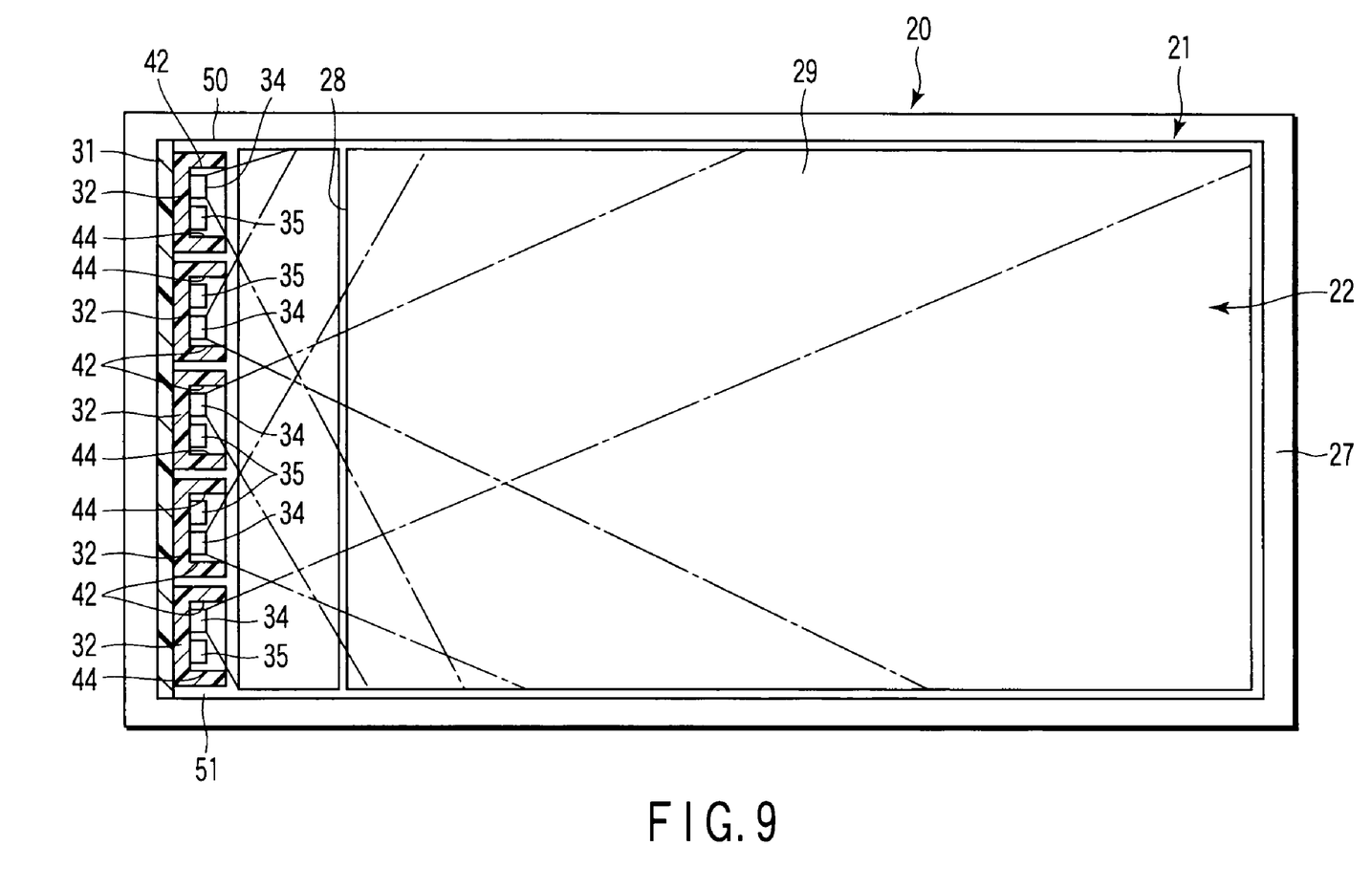
FIG. 9 is a plan view of an example of distribution of red light emitted from each LED package shown in FIG. 2 in a light guide and a light guide plate.

FIG. 9 shows an example of distribution of red light emitted from each LED package 32 in the light guide 25 and the light guide plate 22. In FIG. 9, light components reflected by the light guide 25 and the light guide plate 22 are not shown. As shown in FIG. 9, the LED package 32 disposed at the one end 50 is disposed at a position of the fourth inner face 44 being shifted closer to the side of the other end 51. Hence, the illumination range of the red light emitted from the LED package 32 disposed at the one end 50 is biased to the side of the fourth inner side 44, that is, to the side of the other end 51.

The LED package 32 disposed at one position shifted to the side of the other end 51 is disposed at a position so that the second inner face 42 is shifted to the other end 51 side. Hence, the illumination range of the red light emitted from the LED package 32 is biased to the one end 50 side.

The LED package 32 disposed at one position further shifted to the side of the other end 51 is disposed at a position so that the second inner face 42 is shifted to the one end 50 side. Hence, the illumination range of the red light emitted from the LED package 32 is biased to the one end 50 side.

The LED package 32 disposed at one position further shifted to the side of the other end 51 is disposed at a position so that the second inner face 42 is shifted to the other end 51 side. Hence, the illumination range of the red light emitted from the LED package 32 is biased to the other end 51 side.

The LED package 32 disposed at the other end 51 is disposed so that the second inner face 42 is shifted to the one end 50 side. Hence, the illumination range of the red light emitted from the LED package 32 is biased to the other end 51 side.

The red light components emitted from the LED package 32 are considered to illuminate up to the other end portion of the light source unit 30 at the one end 50 and the other end 51 of the light guide plate 22, in such a manner that the mutually adjacent packages 32 are disposed at positions rotating mutually by 180 degrees. Specifically, the relative shape and relative position of the third housing 33 and the red LED 34 are taken into consideration. Specific examples are positions of the edges 53, 54 of the vertical wall 40 of the third housing 33 relative to the position of the red LED 34.

Thus, the red light components emitted from the LED packages 32 are alternately biased to the one end 50 side and the other end 51 side, and as a result, the red light components reach up to the one end 50 side and the other end 51 side near the light source unit 30 side in the light guide plate 22.

Although not shown in the drawing, as the red light components emitted from the LED packages 32 are reflected, the red light components reach further into the light guide plate 22.

Figure 10:
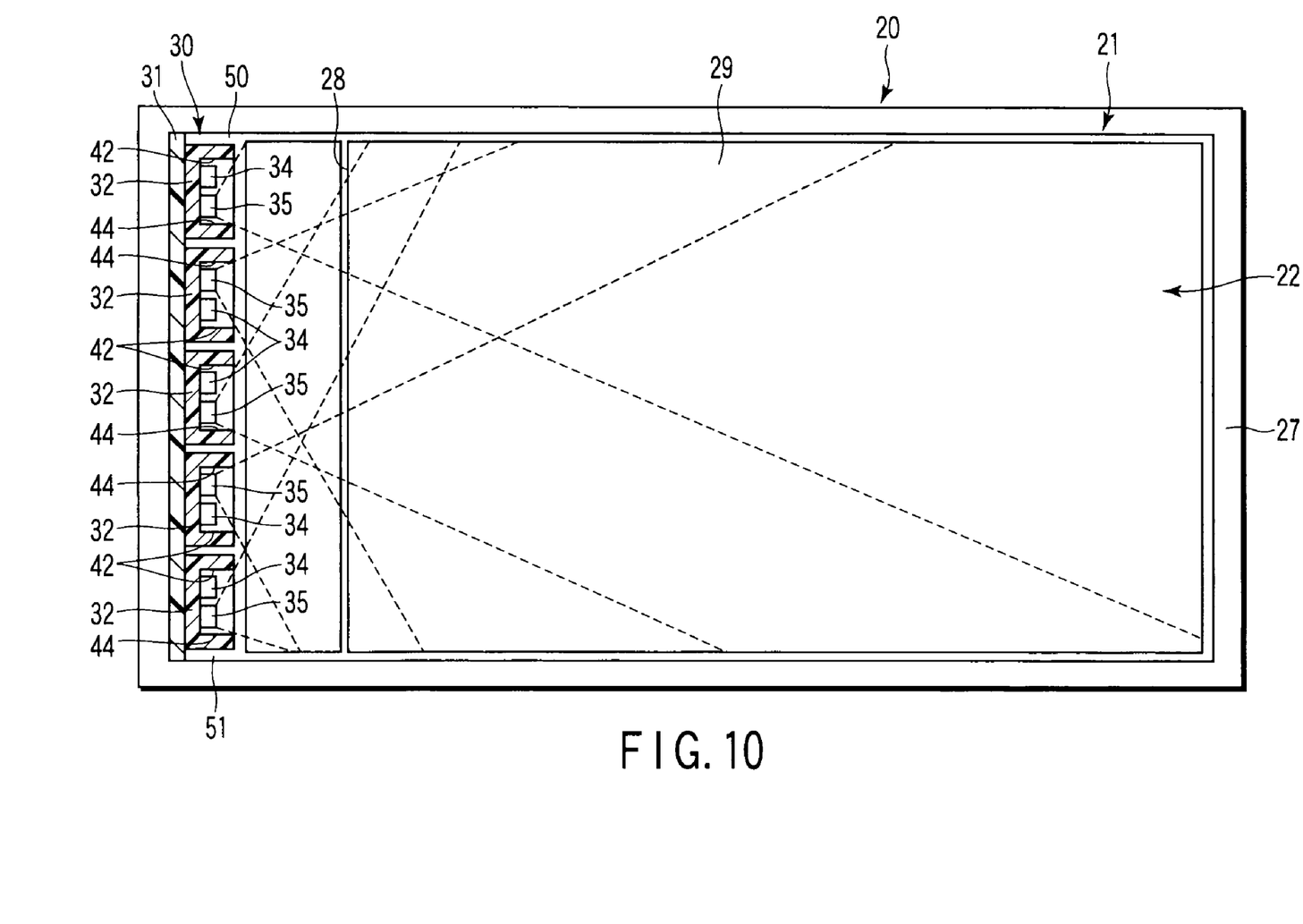
FIG. 10 is a plan view of an example of distribution of blue light emitted from each LED package shown in FIG. 2 in a light guide and a light guide plate.

FIG. 10 shows an example of distribution of blue light emitted from each LED package 32 in the light guide 25 and the light guide plate 22. In FIG. 10, light components reflected by the light guide 25 and the light guide plate 22 are not shown. As shown in FIG. 10, the LED package 32 disposed at the one end 50 is disposed at a position of the second inner face 42 being shifted closer to the side of the one end 50. Hence, the illumination range of the blue light emitted from the LED package 32 disposed at the one end 50 is biased to the side of the one end 50.

The LED package 32 disposed at one position shifted to the side of the other end 51 is disposed at a position so that the second inner face 42 is shifted to the other end 51 side. Hence, the illumination range of the blue light emitted from the LED package 32 is biased to the other end 51 side.

The LED package 32 disposed at one position further shifted to the side of the other end 51 is disposed at a position so that the second inner face 42 is shifted to the one end 50 side. Hence, the illumination range of the blue light emitted from the LED package 32 is biased to the one end 50 side.

The LED package 32 disposed at one position further shifted to the side of the other end 51 is disposed at a position so that the second inner face 42 is shifted to the other end 51 side. Hence, the illumination range of the blue light emitted from the LED package 32 is biased to the other end 51 side.

The LED package 32 disposed at the other end 51 is disposed so that the second inner face 42 is shifted to the one end 50 side. Hence, the illumination range of the blue light emitted from the LED package 32 is biased to the one end 50 side.

The blue light components emitted from the LED package 32 are considered to illuminate up to the other end portion of the light source unit 30 at the one end 50 and the other end 51 of the light guide plate 22, in such a manner that the mutually adjacent packages 32 are disposed at positions rotating mutually by 180 degrees. Specifically, the relative shape and relative position of the third housing 33 and the blue LED 35 are taken into consideration. Specific examples are positions of the edges 53, 54 of the vertical wall 40 of the third housing 33 relative to the position of the blue LED 35.

Thus, the blue light components emitted from the LED packages 32 are alternately biased to the one end 50 side and the other end 51 side, and as a result, the blue light components reach up to the one end 50 side and the other end 51 side near the light source unit 30 side in the light guide plate 22.

Although not shown in the drawing, as the blue light components emitted from the LED packages 32 are reflected, the blue light components reach further into the light guide plate 22.

As mentioned above, the red light, blue light, and green light reach sufficiently into the vicinity of the light source unit 30 at the one end 50 and the other end 51 of the light guide plate 22. As a result, in the light guide plate 22, the red light, blue light, and green light are mixed uniformly.

Thus, in the backlight device 20 having such configuration, the positions of the LEDs 34, 35, 36 of the LED packages 32 with respect to the incident plane 28 of the light guide plate 22 are different in the mutually adjacent LED packages 32. For example, in this embodiment, even if there is deviation in the illumination range of the red LED 34 or the illumination range of the blue LED 35 in the LED packages 32, such deviation scatters, and thus the light of each color is sufficiently sent into the light source unit 30 side end near the one end 50 and the light source unit 30 side end near the other end 51 in the light guide plate 22. Accordingly, in the light guide plate 22, light components of the respective colors are mixed sufficiently in the light source unit 30 side end near the one end 50 and the light source unit 30 side end near the other end 51, and thus uneven color hardly occurs on the light guide plate 22 (on the exist plane 29).

In the embodiment, the layout of the LEDs 34, 35, 36 of the LED packages 32 with respect to the incident plane 28 is different among mutually adjacent LED packages 32. Hence, colors are mixed more efficiently on the light guide plate 22, and thus uneven color hardly occurs.

The LED packages 32 are identical in structure, having the same layout pattern of the LEDs 34, 35, 36. The mutually adjacent LED packages 32 are disposed at relatively rotated positions around the axial center line 52. As a result, the layout of the LEDs 34, 35, 36 of the mutually adjacent LED packages 32 with respect to the incident plane 28 is mutually different.

Thus, when fixing the LED packages 32 on the substrate 31, it is enough to adjust the position of the LED packages 32. Therefore, by using the LED packages 32 of identical structure, the structure of the entire apparatus becomes simple, and occurrence of uneven color on the light guide plate 22 can be suppressed.

Further, by fixing the mutually adjacent LED packages 32 at positions of relative rotation of 180 degrees, deviation of the illumination range of the red light and deviation of the illumination range of the blue light are exchanged alternately. As a result, occurrence of uneven color on the light guide plate 22 can be suppressed more effectively.

A backlight device 20 according to a second embodiment of the invention will be described below by referring to FIG. 11. The same parts as those in the first embodiment are denoted by the same reference numbers and explanation thereof is omitted. This embodiment is different from the first embodiment in the relative rotation angle of the adjacent LED packages 32 around the axial center line 52. The other structure may be the same as in the first embodiment. The different points mentioned above will be specifically described below.

Figure 11:
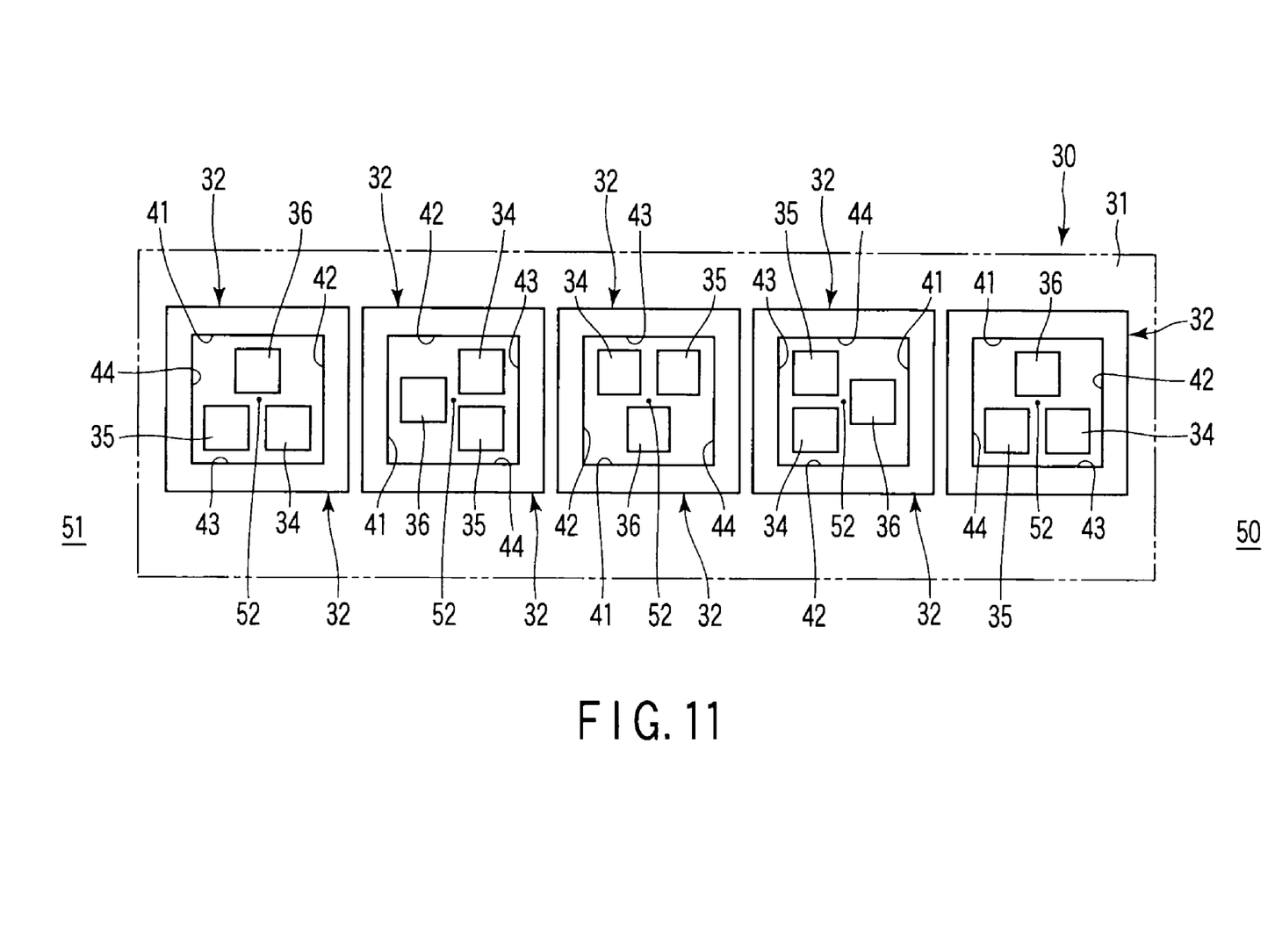
FIG. 11 is a front view of a light source unit of a backlight device according to a second embodiment of the invention.

FIG. 11 is a front view of a light source unit 30 in the embodiment. As shown in FIG. 11, in this embodiment, the adjacent LED packages 32 are disposed at positions of relative rotation of 90 degrees. The rotating direction of the LED packages 32 is the same direction. Also in this embodiment, since deviation of light components emitted from the LEDs 34, 35, 36 is scattered, the same effects as those in the first embodiment may be obtained.

A backlight device 20 according to a third embodiment of the invention will be described below by referring to FIG. 12. The same parts as those in the first embodiment are denoted by the same reference numbers and explanation thereof is omitted. This embodiment is different from the first embodiment in the relative rotation angle of the adjacent LED packages 32 around the axial center line 52. The other structure may be the same as in the first embodiment. The different points mentioned above will be specifically described below.

Figure 12:
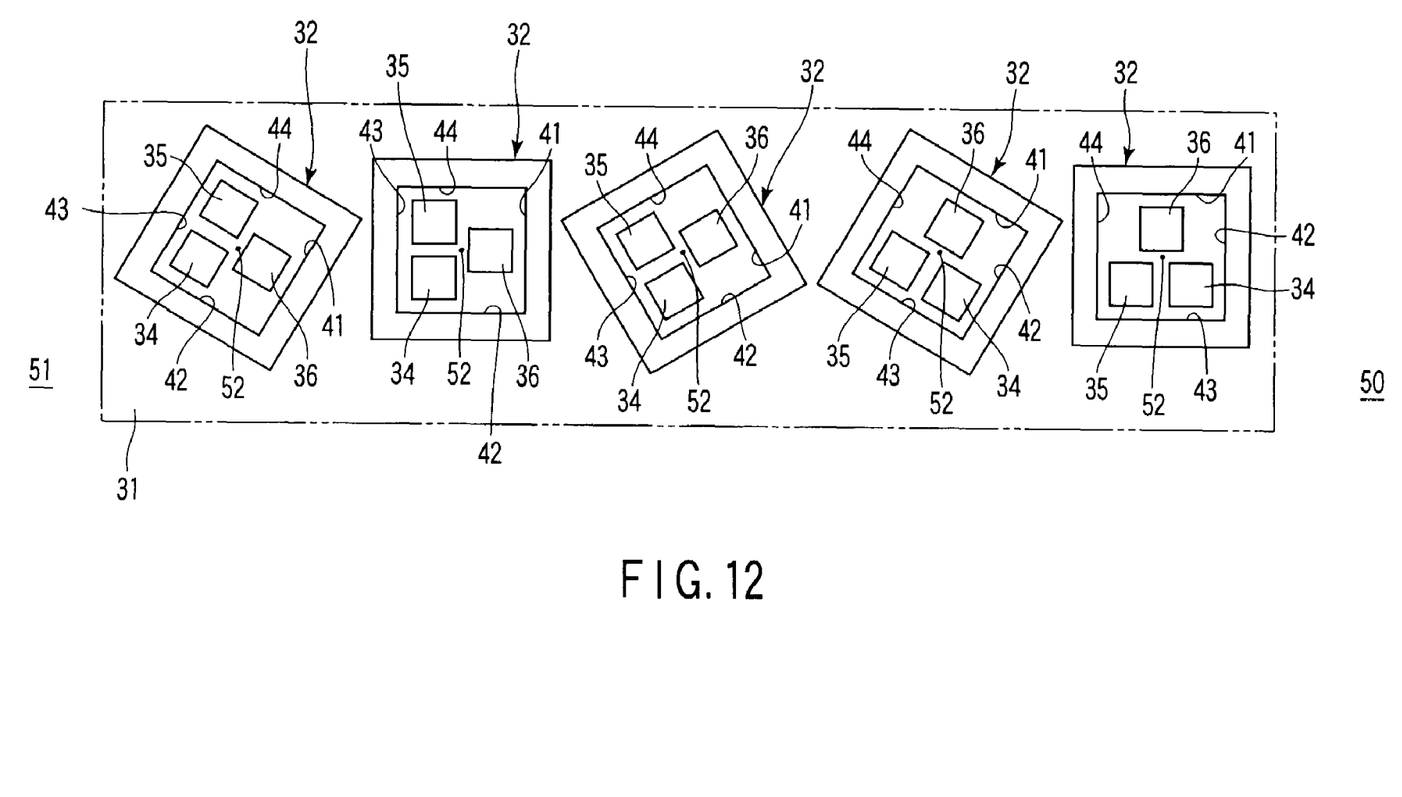
FIG. 12 is a front view of a light source unit of a backlight device according to a third embodiment of the invention.

FIG. 12 is a front view of a light source unit 30 in the embodiment. As shown in FIG. 12, in this embodiment, the adjacent LED packages 32 are disposed at positions of relative rotation of 30 degrees. The rotating direction of the LED packages 32 is the same direction. Also in this embodiment, since deviation of light components emitted from the LEDs 34, 35, 36 is scattered, the same effects as those in the first embodiment may be obtained.

A backlight device 20 according to a fourth embodiment of the invention will be described below by referring to FIG. 13. The same parts as those in the first embodiment are denoted by the same reference numbers and explanation thereof is omitted. This embodiment is different from the first embodiment in the relative rotation angle of the adjacent LED packages 32 around the axial center line 52. The other structure may be the same as in the first embodiment. The different points mentioned above will be specifically described below.

Figure 13:
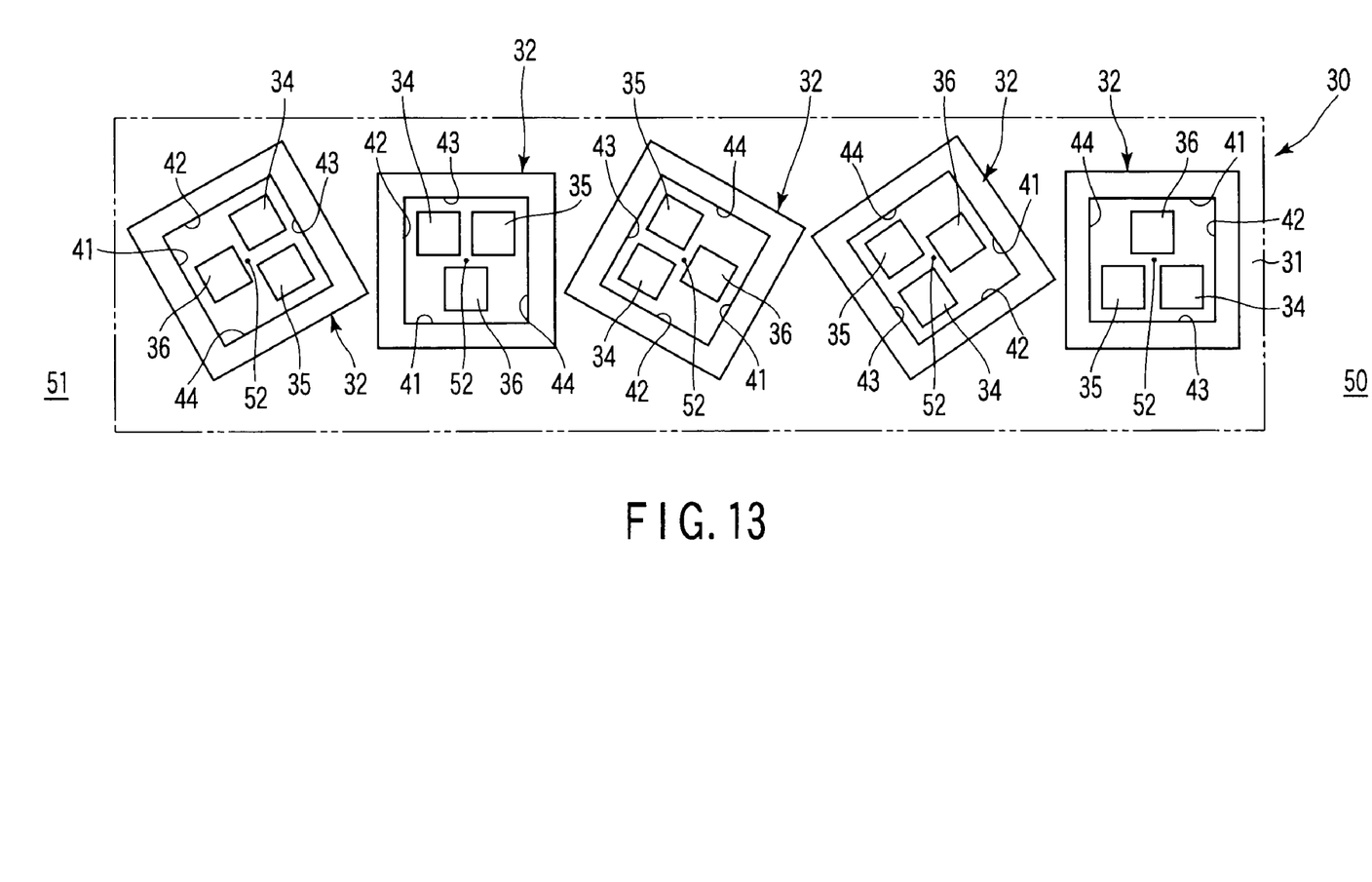
FIG. 13 is a front view of a light source unit of a backlight device according to a fourth embodiment of the invention.

FIG. 13 is a front view of a light source unit 30 in the embodiment. As shown in FIG. 13, in this embodiment, the adjacent LED packages 32 are disposed at positions of relative rotation of 60 degrees. The rotating direction of the LED packages 32 is the same direction. Also in this embodiment, since deviation of light components emitted from the LEDs 34, 35, 36 is scattered, the same effects as those in the first embodiment may be obtained.

In the first to fourth embodiments, the LED packages 32 have their opening 48 sealed by the sealing part 38, but the structure is not limited to this example. For example, the opening 48 may not be sealed by the sealing part 38. In this case, the opening 48 is the passing part of the invention.

In the first to fourth embodiments, the adjacent LED packages 32 rotate by 180 degrees, 90 degrees, 30 degrees, and 60 degrees, respectively, but the angles are not limited thereto. The adjacent LED packages 32 may rotate in the same direction around the axial center line 52 by 120 degrees, 150 degrees, 210 degrees, 240 degrees, 270 degrees, 300 degrees, or 330 degrees. Also in these examples, the same effects as those in the first to fourth embodiments may be obtained.

In short, when the adjacent LED packages 32 rotate about the axial center line 52 by 30×n degrees (n being 1, 2, 3, 4, 5, 6, 7, 8, 9, 10, 11), the same effects as those in the first to fourth embodiments may be obtained.

In the first to fourth embodiments, the package 32 includes three light sources (green LED 36, red LED 34, and blue LED 35), without being limited to this example. For example, it may include four light sources. In such a case, for example, it may include one red LED 34, one blue LED 35, and two green LEDs 36.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A backlight device comprising:
a plurality of packages; and
a light guide plate provided with an incident plane which receives light emitted from the package, and an exit plane which emits the incident light from the incident plane to outside,
wherein the package comprises: (i) a housing for package provided with a tubular part having a wall surrounding the circumference, a bottom wall provided at one end of the tubular part, and a passing part provided at the other end of the tubular part for passing the light from inside to outside of the tubular part; and (ii) a plurality of light sources emitting light contained in the housing for package, and disposed in the bottom wall,
said plurality of packages are arrayed in one direction, and at least part of a layout of said light sources relative to the incident plane is different from mutually adjacent packages.

2. The backlight device according to claim 1,
wherein said plurality of light sources comprise at least a light source which emits red light, a light source which emits green light, and a light source which emits blue light.

3. The backlight device according to claim 1,
wherein said plurality of light sources are disposed in the bottom wall according to a specified layout pattern, and
said each package is disposed at a position rotating relatively about the axial center line of the housing for package with respect to the position of the adjacent package.

4. The backlight device according to claim 3,
wherein said each package is at a position rotating by 30×n degrees (n being 1, 2, 3, 4, 5, 6, 7, 8, 9, 10, 11) in a specific direction around the axial center line with respect to the position of the adjacent package along one direction out of array directions of a plurality of packages.

5. A liquid crystal display device comprising:
a housing for liquid crystal display device;
a liquid crystal panel contained in the housing for liquid crystal display device; and
a backlight device contained in the housing for liquid crystal display device, the backlight device comprising a plurality of packages, and a light guide plate provided with an incident plane which receives light emitted from the package, and an exit plane which emits the incident light from the incident plane to outside,
wherein the package comprises: (i) a housing for package provided with a tubular part having a wall surrounding the circumference, a bottom wall provided at one end of the tubular part, and a passing part provided at the other end of the tubular part for passing the light from inside to outside of the tubular part; and (ii) a plurality of light sources emitting light contained in the housing for package, and disposed in the bottom wall,
said plurality of packages are arrayed in one direction, and
at least part of a layout of said light sources relative to the incident plane is different from mutually adjacent packages.

6. The liquid crystal display device according to claim 5,
wherein said plurality of light sources comprise at least a light source which emits red light, a light source which emits green light, and a light source which emits blue light.

7. The liquid crystal display device according to claim 5,
wherein said plurality of light sources are disposed in the bottom wall according to a specified layout pattern, and
said each package is disposed at a position rotating relatively about the axial center line of the housing for package with respect to the position of the adjacent package.

8. The liquid crystal display device according to claim 7,
wherein said each package is at a position rotating by 30×n degrees (n being 1, 2, 3, 4, 5, 6, 7, 8, 9, 10 11) in a specific direction around the axial center line with respect to the position of the adjacent package along one direction out of array directions of a plurality of packages.

* * * * *